United States Patent
Main et al.

(10) Patent No.: US 10,633,843 B2
(45) Date of Patent: Apr. 28, 2020

(54) TEMPERATURE LIMITING FAUCET

(71) Applicant: Masco Canada Limited, St. Thomas (CA)

(72) Inventors: Brian David Main, Woodstock (CA); Bryan Todd Fisher, Appin (CA); Paul McLennan, London (CA); Frank Stauder, London (CA)

(73) Assignee: MASCO CANADA LIMITED, St. Thomas (CA)

( * ) Notice: Subject to any disclaimer, the term of this patent is extended or adjusted under 35 U.S.C. 154(b) by 0 days.

(21) Appl. No.: 15/723,403

(22) Filed: Oct. 3, 2017

(65) Prior Publication Data

US 2019/0101944 A1  Apr. 4, 2019

Related U.S. Application Data

(60) Provisional application No. 62/408,479, filed on Oct. 14, 2016.

(51) Int. Cl.
| | | |
|---|---|---|
| *E03C 1/04* | (2006.01) | |
| *E03C 1/05* | (2006.01) | |
| *G05D 23/13* | (2006.01) | |

(52) U.S. Cl.
CPC .............. *E03C 1/057* (2013.01); *E03C 1/041* (2013.01); *G05D 23/1313* (2013.01)

(58) Field of Classification Search
CPC ......... E03C 1/0403–0404; E03C 1/041; E03C 1/055; E03C 1/057; E03C 2001/026; G05D 16/063; G05D 16/08; G05D 23/1313; G05D 23/134; G05D 23/1353; G05D 23/136; G05D 23/1366; G05D 23/1373; G05D 23/1393; G05D 23/1858; G05D 23/022; G05D 23/123; Y10T 137/2705; Y10T 137/9464
USPC ..................................... 4/675–678; 236/93 B
See application file for complete search history.

(56) References Cited

U.S. PATENT DOCUMENTS

| | | | | |
|---|---|---|---|---|
| 3,263,926 A | * | 8/1966 | Couffer ................... | F16K 17/38 236/93 R |
| 3,368,758 A | | 2/1968 | Fraser | |
| 4,243,063 A | * | 1/1981 | Parkison ............. | F16K 11/0746 137/100 |
| 4,953,236 A | * | 9/1990 | Lee ........................ | E03C 1/057 236/12.12 |

(Continued)

*Primary Examiner* — Erin Deery
*Assistant Examiner* — Nicholas A Ros
(74) *Attorney, Agent, or Firm* — Reising Ethington P.C.

(57) ABSTRACT

A faucet includes a housing defining hot and cold inlets and an outlet and hot and cold fluid conduits in communication with the hot and cold inlets. A mixer within the housing receives fluids from the fluid conduits and outputs one of the fluids or a mixture thereof. The mixer includes a valve and an actuator configured to move the valve to different positions establishing various ratios of fluids output by the mixer. A temperature actuated flow reducing device within the housing downstream of the mixer restricts a flow of fluid to the outlet when a temperature of the fluid exceeds a predetermined temperature. A first pressure compensating flow regulator upstream of the mixer controls a flow of fluid from the hot fluid conduit to the mixer while a second pressure compensating flow regulator downstream of the mixer controls a flow of fluid through the outlet.

27 Claims, 4 Drawing Sheets

(56) References Cited

U.S. PATENT DOCUMENTS

| | | | |
|---|---|---|---|
| 5,141,153 A | 8/1992 | Jeffress | |
| 5,224,509 A * | 7/1993 | Tanaka | E03C 1/057 137/315.03 |
| 5,341,987 A * | 8/1994 | Ackroyd | G05D 23/136 236/12.21 |
| 5,931,181 A * | 8/1999 | Cook | E03C 1/041 137/100 |
| 6,059,192 A | 5/2000 | Zosimadis | |
| 6,250,558 B1 * | 6/2001 | Dogre Cuevas | E03C 1/05 236/12.12 |
| 7,134,451 B1 | 11/2006 | Malapanes | |
| 7,458,520 B2 * | 12/2008 | Belz | G05D 23/1393 236/12.12 |
| 8,051,507 B2 * | 11/2011 | Lin | E03C 1/04 137/603 |
| 8,376,241 B2 | 2/2013 | Green et al. | |
| 9,464,414 B2 * | 10/2016 | Shapira | E03C 1/04 |
| 2005/0173545 A1 | 8/2005 | Strader et al. | |
| 2006/0214016 A1 * | 9/2006 | Erdely | G05D 23/1393 236/12.12 |
| 2007/0063158 A1 * | 3/2007 | Parsons | E03C 1/05 251/129.04 |
| 2007/0157976 A1 * | 7/2007 | Paterson | E03C 1/057 137/606 |
| 2009/0314845 A1 | 12/2009 | Green et al. | |
| 2010/0123013 A1 | 5/2010 | Beck et al. | |
| 2010/0252640 A1 | 10/2010 | Goncze | |
| 2013/0340162 A1 | 12/2013 | Peel | |
| 2013/0340869 A1 | 12/2013 | Peel | |
| 2015/0355648 A1 * | 12/2015 | Tempel | E03C 1/041 236/101 R |
| 2015/0361643 A1 | 12/2015 | Wu | |
| 2016/0011606 A1 | 1/2016 | Draber et al. | |
| 2016/0017578 A1 | 1/2016 | Cheng | |
| 2017/0328041 A1 * | 11/2017 | Seggio | G05D 23/13 |

* cited by examiner

TEMPERATURE LIMITING FAUCET

BACKGROUND a. Field

This disclosure relates generally to faucets used to control the flow of fluid. More specifically, this disclosure pertains to a faucet through which temperature is controlled using a combination of temperature actuated and pressure compensating flow control mechanisms.

b. Background Art

Building codes in many jurisdictions require that faucets include devices that limit the temperature of fluids exiting from the faucet (typically to a temperature under 120 degrees Fahrenheit) in order to prevent scalding. For example, many building codes require that faucets meet the standards promulgated by the American Society of Sanitary Engineering (ASSE) in standard ASSE 1070-2004 titled "Performance Requirements for Water Temperature Limiting Devices". In many conventional faucets, a thermostatic mixing valve is installed externally to, and upstream of, the faucet in the fluid pathway to control the ratio of hot and cold water and maintain the temperature of the fluid exiting the faucet below a predetermined threshold. In other conventional faucets, a temperature actuated flow reducing device is installed externally to, and downstream of, the faucet to reduce or eliminate the flow of fluid when the temperature of the fluid exceeds a predetermined threshold.

In general, faucets of the type described in the preceding paragraph adequately control the temperature of water exiting the faucet. The faucets have several drawbacks, however. The use of devices external to the faucet requires additional space and can negatively impact the aesthetics of the faucet. Further, temperature actuated flow reducing devices are frequently actuated due to changes in fluid line pressure creating an inconvenience for users.

The inventors herein have recognized a need for a faucet that will overcome one or more of the above-identified deficiencies.

BRIEF SUMMARY

A faucet for controlling the flow of fluids is provided. In particular, a faucet is provided that controls the temperature of a fluid using a combination of temperature actuated and pressure compensating flow control mechanisms and does so in a relatively small and aesthetically pleasing package and without the inconveniences of conventional faucets.

A faucet in accordance with one embodiment includes a housing defining hot and cold inlets and an outlet. The faucet further includes a hot fluid conduit in fluid communication with the hot inlet and a cold fluid conduit in fluid communication with the cold inlet. The faucet further includes a mixer disposed within the housing and configured to receive a first fluid from the hot fluid conduit and a second fluid from the cold fluid conduit and to output the first fluid, the second fluid or a mixture of the first and second fluids. The mixer includes a valve and an actuator configured to move the valve to any of a plurality of positions, each position establishing a different ratio of an amount of the first fluid relative to an amount of the second fluid output by the mixer. The faucet further includes a temperature actuated flow reducing device disposed within the housing downstream of the mixer and configured to restrict a flow of fluid to the outlet when a temperature of the fluid exceeds a predetermined temperature. The faucet further includes a first pressure compensating flow regulator disposed upstream of the mixer and configured to control a flow of fluid from the hot fluid conduit to the mixer and a second pressure compensating flow regulator disposed downstream of the mixer and configured to control a flow of fluid through the outlet.

A faucet in accordance with another embodiment includes a housing defining hot and cold inlets and an outlet. The faucet further includes a hot fluid conduit in fluid communication with the hot inlet and a cold fluid conduit in fluid communication with the cold inlet. The faucet further includes a mixer disposed within the housing and configured to receive a first fluid from the hot fluid conduit and a second fluid from the cold fluid conduit and to output the first fluid, the second fluid or a mixture of the first and second fluids. The mixer includes a valve and an actuator configured to move the valve to any of a plurality of positions, each position establishing a different ratio of an amount of the first fluid relative to an amount of the second fluid output by the mixer. The plurality of positions includes a maximum position establishing a first maximum amount of fluid from the hot fluid conduit and a comfort position establishing a second maximum amount of fluid from the hot fluid conduit, the second maximum amount less than the first maximum amount. The faucet further includes a temperature actuated flow reducing device disposed within the housing downstream of the mixer and configured to restrict a flow of fluid to the outlet when a temperature of the fluid exceeds a predetermined temperature. The faucet further includes a first pressure compensating flow regulator disposed upstream of the mixer and configured to control a flow of fluid from the hot fluid conduit to the mixer and a second pressure compensating flow regulator disposed downstream of the mixer and configured to control a flow of fluid through the outlet.

The foregoing and other aspects, features, details, utilities, and advantages of the disclosed embodiments will be apparent from reading the following description and claims, and from reviewing the accompanying drawings.

DETAILED DESCRIPTION

Figure 1:
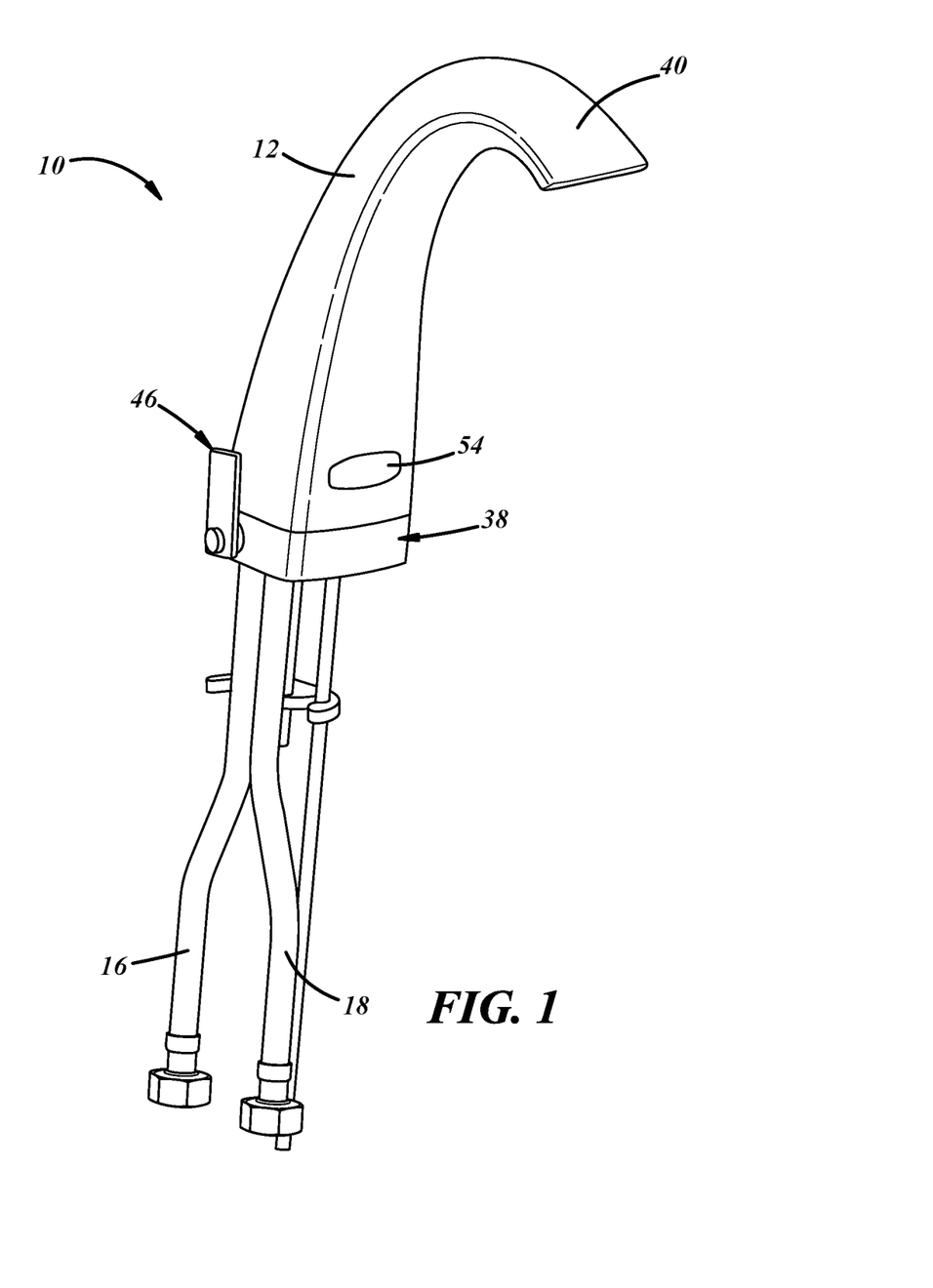
FIG. 1 is a perspective view of one embodiment of a faucet.
Figure 2:
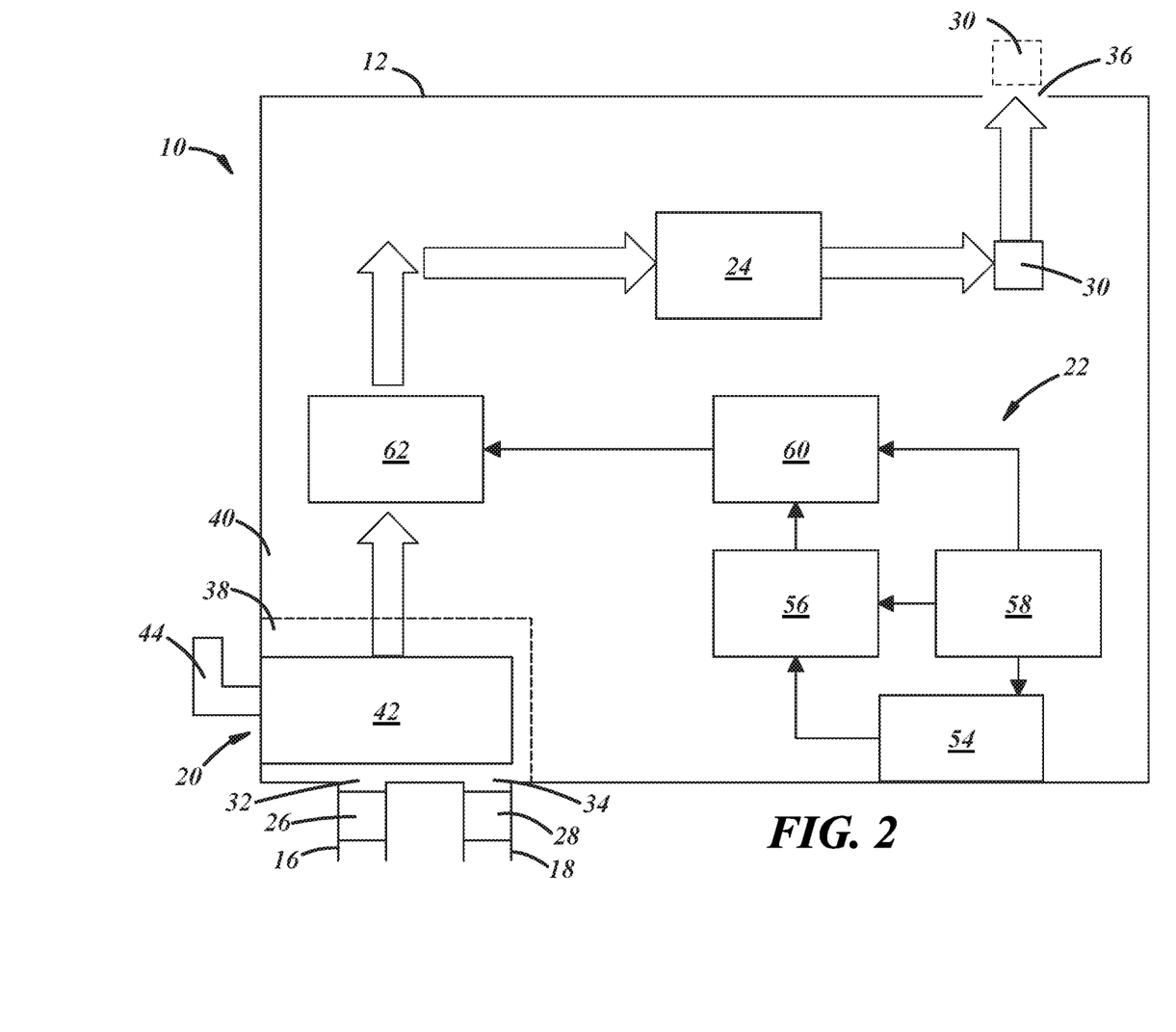
FIG. 2 is a diagrammatic view of the faucet of FIG. 1.

Referring now to the drawings wherein like reference numerals are used to identify identical components in the various views, FIG. 1 illustrates one embodiment of a faucet 10 for use in controlling the flow of fluid from a fluid source. In the illustrated embodiment, faucet 10 is used to control the flow of water from municipal or home water lines and is adapted for use in a kitchen or bathroom sink. It should be understood, however, that the teachings herein could be implemented in a variety of faucets including those used in showers and bath tubs. Faucet 10 may include a housing 12, a mounting stud 14 (best shown in FIG. 3A) and hot and cold fluid conduits 16, 18. Referring to FIG. 2, faucet 10 may also include a mixer 20, an actuator 22, a temperature actuated flow reducing device 24, and one or more pressure compensating flow regulators 26, 28, 30.

Referring again to FIG. 1, housing 12 is provided to protect the internal components of faucet 10 from foreign objects and elements, to position and orient those components relative to one another and to provide an aesthetically pleasing appearance to a user. Although the exterior of housing 12 has a particular form in the illustrated embodiment, it should be understood that the form of housing 12 may vary. Referring to FIGS. 2 and 3B, housing 12 may define hot and cold inlets 32, 34 that are configured to receive fluid from hot and cold fluid conduits 16, 18, respectively. Inlets 32, 34, may be formed at one end of housing 12 and may include features formed therein for retaining conduits 16, 18, of for supporting coupling elements used to retain conduits 16, 18. Housing 12 may also define an outlet 36 at an opposite end of housing 12 through which fluid exits faucet 10 for use by a user of faucet 10. Referring to FIG. 1, housing 12 may include multiple members 38, 40. Member 38 may be disposed proximate one end of housing 12 and form a base in the illustrated embodiment defining inlets 32, 34. Member 38 may be configured to house mixer 20. Member 40 may form a spout in the illustrated embodiment defining outlet 36. Member 40 may be configured to house actuator 22 and device 24 among other components. Members 38, 40 may be joined to one another in a variety of ways to form a fluid tight seal including through use of adhesives or welds. Alternatively, members 38, 40 may be joined by fasteners with a seal formed around between or around the intersection of members 38, 40.

Figure 3A:
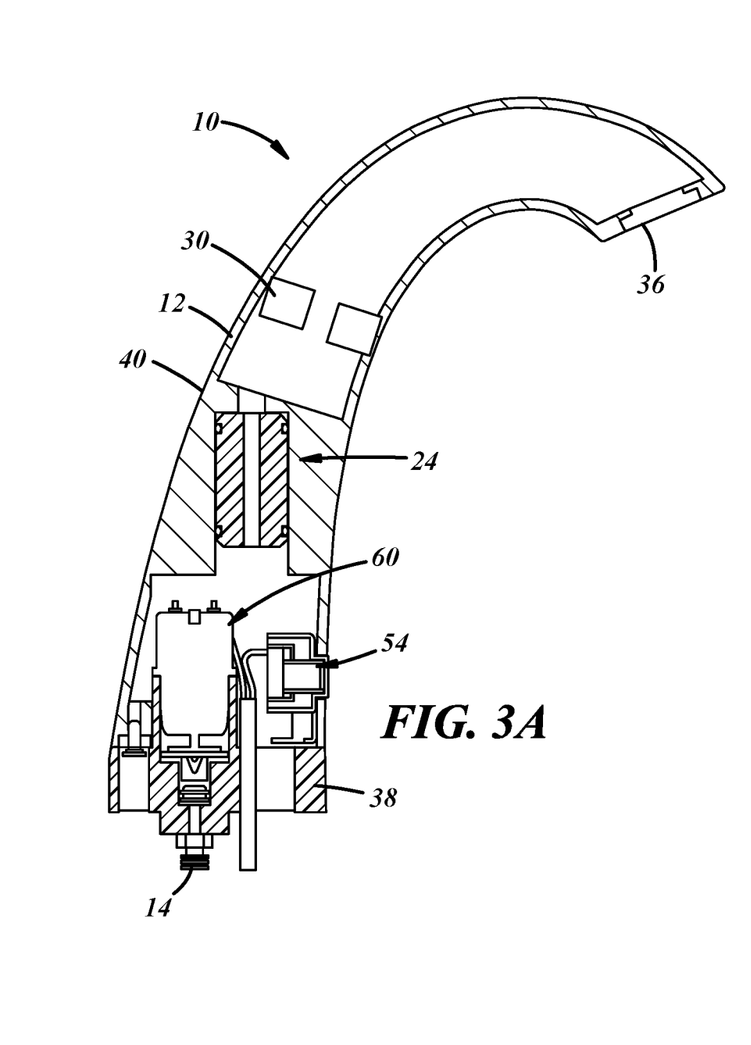
FIGS. 3A-B are cross-sectional views of the faucet of FIG. 1.
Figure 3B:
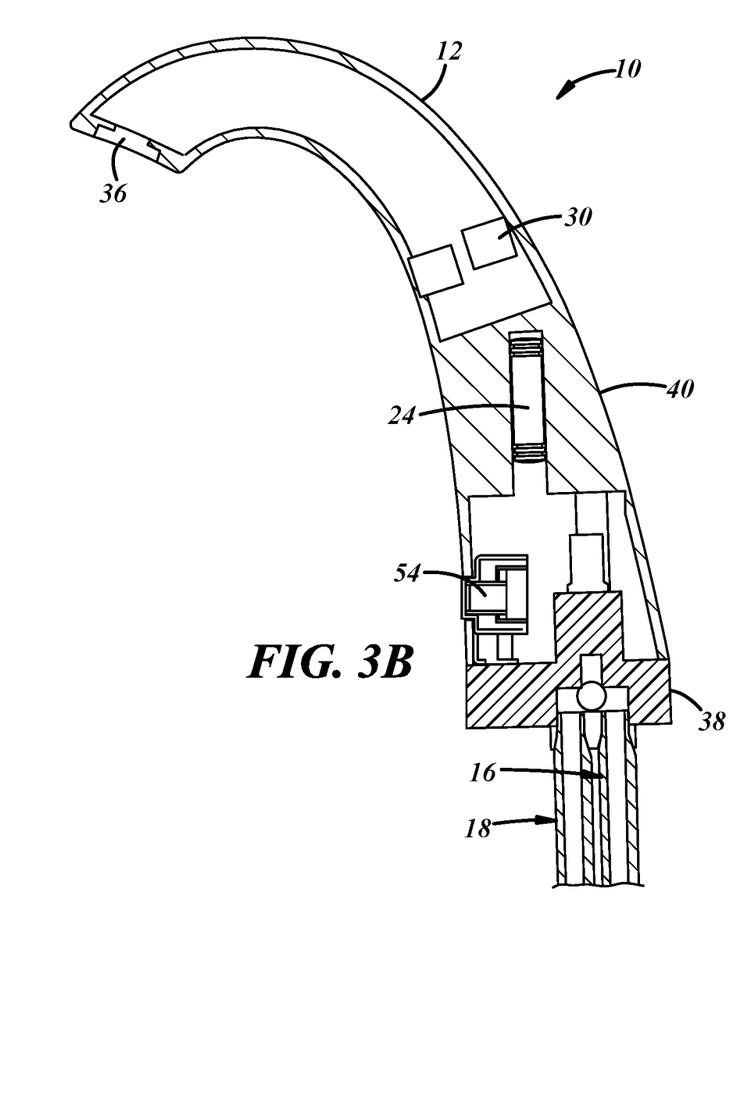

Referring to FIG. 3A, mounting stud 14 is provided to secure faucet 10 to surrounding structure. Stud 14 may be threaded and depends from member 38 of housing 12. Stud 14 may, for example, be inserted in an aperture on one side of a deck/counter surrounding a sink and secured using a nut placed over the stud and rotated until the nut abuts the underside of the deck/counter.

Referring to FIG. 2, hot and cold fluid conduits 16, 18 are provided for delivering hot and cold fluids to mixer 20. It should be understood that "hot" and "cold" as used herein refer to a difference in relative temperature among the fluids delivered by conduits 16, 18 as opposed to any specific temperature values for those fluids. In particular, the fluid conveyed by hot fluid conduit 16 will have a higher temperature than the fluid conveyed by cold fluid conduit 18 and will typically be heated by a conventional water heater or similar device. Conduits 16, 18 may be made from conventional metals and/or plastics and typically comprise a multi-layer wall having metallic and/or thermoplastic layers configured to achieve a variety of desirable characteristics including, for example, fluid sealing, temperature resistance and flexibility. Hot fluid conduit 16 is in fluid communication with hot inlet 32 while cold fluid conduit 18 is in fluid communication with cold inlet 34. Conduits 16, 18 may be joined to member 38 of housing 12 using conventional coupling mechanisms.

Figure 4:
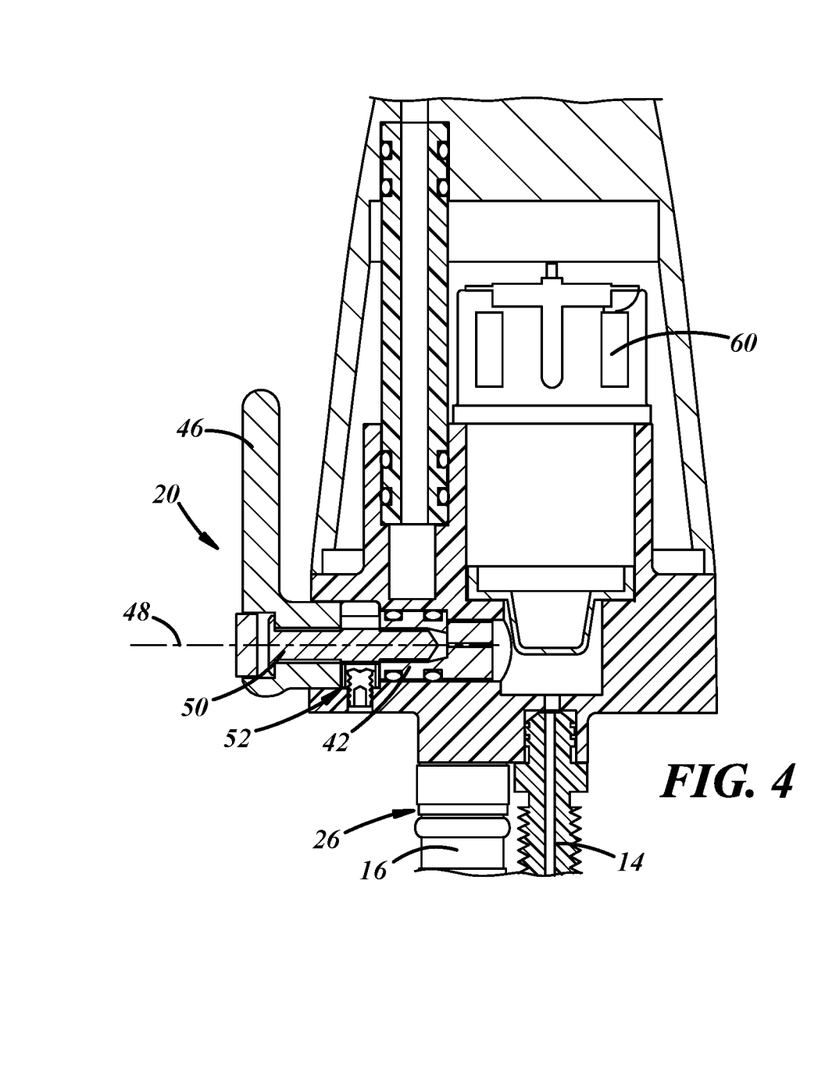
FIG. 4 is a cross-sectional view of the faucet of FIG. 1.

Mixer 20 is provided control the ratio of hot and cold fluids delivered to outlet 36. Mixer 20 is configured to receive a first fluid from hot fluid conduit 16 through inlet 32 in member 38 of housing 12 and a second fluid from cold fluid conduit 18 through inlet 34 in member 38 of housing 12 and to output either the first fluid, the second fluid or a mixture of the first and second fluids. Mixer 20 includes a valve 42 that is disposed within member 38 of housing 12 and an actuator 44 extending outwardly from member 38 of housing 12 to allow a user to adjust the position of valve 42 and thereby control the amount of fluids from each of hot and cold fluid conduits 16, 18 that are output by mixer 20. Referring to FIG. 4, the actuator 44 includes a handle 46 that is configured to rotate about an axis 48. The handle 46 is connected to the valve 42 by a fastener 50 through which the handle 46 adjusts the position of the valve 42. The actuator 44 is capable of moving the valve 42 to any of a plurality of positions with each position establishing a different ratio of the amount of fluid from the hot fluid conduit 16 relative to the amount of fluid from the cold fluid conduit 18 that is output by the mixer 20. In accordance with certain embodiments, a limit stop ring 52 disposed about the fastener 50 is used to establish one or more limits on the position of the actuator 44 and, therefore, the valve 42 in order to prevent undesirable temperatures in the fluid output of mixer 20. In accordance with one embodiment, the ring 52 may assume two positions—one position that establishes a first maximum for the amount of fluid from hot fluid conduit 16 that can be output by mixer 20 and another position that establishes a second maximum, lower than the first maximum, for the amount of fluid from conduit 16 that can be output by mixer 20. The first maximum may be configured to prevent injury to users by establishing an upper limit on the amount of hot fluids from hot fluid conduit 16 that may be output by mixer 20. The second maximum may be configured to establish a lower limit on the amount of hot fluids from conduit 16 to provide a "comfort" setting for the user that is lower than the limit used to prevent injury.

Referring again to FIG. 2, actuator 22 is provided to turn the faucet on or off in the presence of a user. Actuator 22 may include a sensor 54, a controller 56 a power source 58, a solenoid 60 and a valve 62.

Sensor 54 detects the presence of an object (e.g., a person) within a defined area outside of and proximate to housing 12. Sensor 54 may include a light emitter such as light emitting diode and a light detector such as a photodiode and may be configured to emit and detect infrared light. The light detector detects infrared light reflected by the presence of an object in the path of the emitted light and converts the light into current thereby producing a signal indicative of the presence of the object. In alternate embodiments, sensor 54 may be disposed outside of housing 12 (e.g., below a counter/deck) and may comprise a proximity/capacitance sensor.

Controller 56 is configured to control solenoid 60 responsive to the signal generated by sensor 54. Controller 56 may comprise a programmable microprocessor or an application specific integrated circuit (ASIC). Controller 56 may include a central processing unit (CPU) and an input/output (I/O) interface through which controller 56 may receive of input signals including signals generated by sensor 54 and generate output signals including those used to control solenoid 60. In the embodiment shown in FIG. 2, controller 56 is disposed within housing 12 of faucet 10. In other embodiments, controller 56 may be located outside of housing 12 (e.g., below the deck of a counter or sink) and wires or other conductors may extend between controller 56 and sensor 54 and solenoid 60 through openings in member 38 of housing 12. Although the sensor 54 and controller 56 are illustrated as separate structures, it should be understood that the sensor 54 and controller 56 could be integrated into a single electronic component.

Power source 58 provides current to electronic components such as sensor 54, controller 56, and solenoid 60. Power source 58 may comprise a battery or a capacitor that is disposed within housing 12 as illustrated in FIG. 2 or outside of housing 12 (e.g., below the deck of a counter or sink). Power source 58 may also comprise an interface to the electrical grid such as an building electrical outlet.

Solenoid 60 is provided to control the position of valve 62 and may be disposed within housing 12. In the presence of an object, sensor 54 generates a signal and provides that signal to controller 56. In response, controller 56 outputs a signal that causes solenoid 60 to open valve 62 and allow fluid flow through valve 62. When the object moves a sufficient distance away from sensor 54, the signal from sensor 54 is terminated and, in response, controller 56 directs solenoid 60 to close valve 62 and prevent further fluid flow through valve 62. It should be understood that variations in the control method disclosed herein are possible including methods in which controller 56 directs solenoid 60 to maintain valve 62 in an open position for a predetermined period of time before closing valve 62.

Valve 62 controls the flow of fluid from mixer 20 towards outlet 36. Valve 62 is capable of assuming an open position wherein fluid flows from mixer 20 to towards outlet 36 and a closed position blocking fluid flow from mixer 20 to outlet 36. Valve 62 is disposed within housing 12 and is moved between the open and closed positions responsive to the movement of solenoid 60.

Temperature actuated flow reducing device 24 is provided to limit or prevent the flow of fluid if the temperature of the fluid exceed a predetermined threshold temperature. Device 24 is disposed within member 40 of housing 12 and may, when activated, limit the flow to a rate of less than 0.2 gpm. Because device 24 is located within housing 12, device 24 does not negatively impact the available space around faucet 10 nor the aesthetic appearance of faucet 10. Device 24 is located downstream of mixer 20 and is separated from mixer 20. Device 24 may assume a variety of forms. In one embodiment, device 24 includes a wax motor that acts on a valve to close the valve in the presence of elevated temperatures. In particular, when the temperature of the fluids exceed the predetermined threshold temperature, wax in the wax motor expands causing a plunger or rod to move a valve member to a closed position to limit or prevent further fluid flow.

Pressure compensating flow regulators 26, 28, 30 are provided to control fluid flow in response to changes in pressure. Regulators 26, 28, 30 may take a variety of forms, but will typically include a device that measures or reacts to a difference in pressure across an orifice through which fluid flows and a mechanism (e.g., a spring-biased compensator) for varying the size of the orifice in response to the difference in pressure in order to maintain a constant flow. The exact configuration of regulators 26, 28, 30 will depend on temperature and flow requirements for faucet 10 and other application specific parameter values. In accordance with one embodiment, regulators 26, 30 are used to provide enhanced control of fluids in faucet 10 in order to control the temperature of fluids output by faucet 10 through outlet 36. The user of regulators 26, 30 compensates for changes in fluid pressure and prevents undesirable actuation of device 24 due to changes in line pressure that may otherwise create inconveniences for a user. Regulator 26 is located upstream of mixer 20 and is configured to control the flow of fluid from the hot fluid conduit 16 to the mixer 20. Regulator 26 may be disposed in the hot fluid flow conduit 16 or within member 38 of housing 12 in the fluid path from conduit 16 to mixer 20. Another regulator 30 is located downstream of mixer 20. In the illustrated embodiment, regulator 30 is located downstream of device 24, but regulator 30 may alternatively be located upstream of device 24. Regulator 30 may be located within member 40 of housing 12 as shown by the solid line box in FIG. 2, or, as shown by the dashed line box in FIG. 2, external to housing 12 and is configured to control a flow of fluid through outlet 36. As a result of regulators 26, 30, if the inlet pressure from hot fluid conduit 16 increases above the inlet pressure of cold fluid conduit 18 (or the inlet pressure of cold fluid conduit 18 decreases below the inlet pressure of hot fluid conduit 16), regulator 26 can maintain or reduce the flow rate of fluid from hot fluid conduit 16 to thereby limit the temperature of the fluid within faucet 10 and limiting the instances in which device 24 limits or prevents fluid flow. If the inlet pressure from hot fluid conduit 16 decreases below the inlet pressure of cold fluid conduit 18 (or the inlet pressure of cold fluid conduit 18 increases above the inlet pressure of hot fluid conduit 16), the flow rate of the fluid from cold fluid conduit 18 will increase and the temperature of the fluid will be maintained or reduced. In still other embodiments, another regulator 28 may be installed upstream of mixer 20 and be configured to control the flow of fluid from cold fluid conduit 18 to mixer 20.

Figure 5:
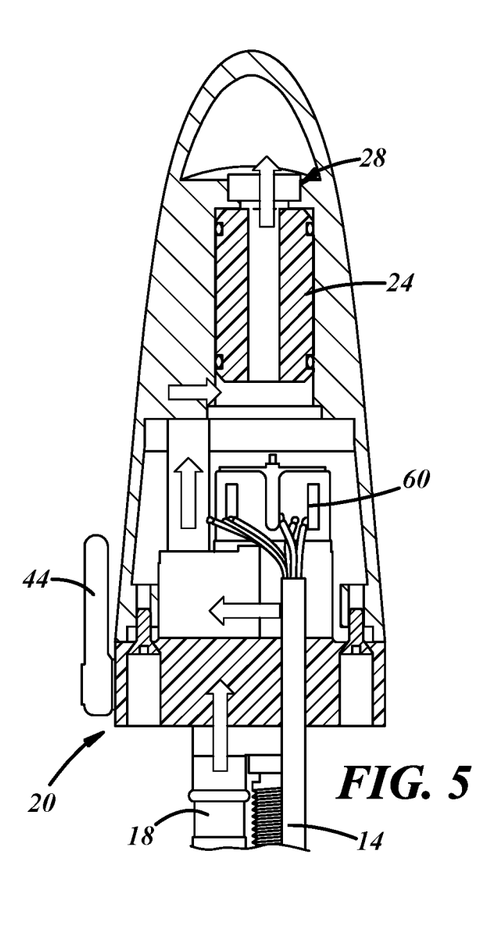
FIG. 5 is a cross-sectional view of the faucet of FIG. 1 illustrating fluid flow within the faucet.

Referring to FIGS. 2 and 5, in illustrated embodiment, water enters inlets 32, 34 in housing from hot and cold fluid conduits 16, 18, respectively. Regulators 26, 28 may adjust the flow of fluids from either line responsive to changes in fluid pressure. Mixer 20 controls the amount of fluid from each conduit 16, 18 that is directed towards outlet 36 in housing 12 based on the position of actuator 44 and valve 42 in mixer 20. Fluid is held in place proximate the outlet of mixer 20 until sensor 54 detects an object proximate faucet 10. In response to a signal from sensor 54, controller 56 causes solenoid 60 to open a valve 62 and permit fluid to flow from mixer 20 towards outlet 36 in housing 12. If the temperature of the fluid exceeds a predetermined threshold, device 24 may restrict the flow of fluid. Otherwise, fluid proceeds through device 24 and exits outlet 36 in housing 12 subject to control of the flow by regulator 30.

A faucet in accordance with the present teachings is advantageous relative to conventional faucets because the faucet is capable of controlling the temperature of fluids exiting the faucet to prevent injury while doing so in a relatively small and aesthetically pleasing package and without the inconveniences of conventional mechanisms for controlling fluid temperatures. The faucet is configured to be installed above deck and may include components such as the mixer, actuator and flow controls above deck allowing for rapid installation and maintenance and eliminating the need to mount a component housing below the deck or in a wall. The faucet may also permit the user to establish a maximum fluid temperature below a predetermined injury standard.

While the invention has been shown and described with reference to one or more particular embodiments thereof, it will be understood by those of skill in the art that various changes and modifications can be made without departing from the spirit and scope of the invention. Features of various implementing embodiments may be combined to form further embodiments of the invention.

We claim:

1. A faucet, comprising:
    a housing defining hot and cold inlets and an outlet;
    a hot fluid conduit in fluid communication with the hot inlet;
    a cold fluid conduit in fluid communication with the cold inlet;
    a mixer disposed within the housing and configured to receive a first fluid from the hot fluid conduit and a second fluid from the cold fluid conduit and to output a mixture of the first and second fluids, the mixer including a mixing valve and an actuator configured to move the mixing valve to any of a plurality of positions, each position establishing a different ratio of an amount of the first fluid relative to an amount of the second fluid output by the mixer;

a temperature actuated flow reducing device disposed within the housing downstream of the mixer and configured to restrict a flow of the mixture from the mixer to the outlet when a temperature of the fluid exceeds a predetermined temperature;

a first pressure compensating flow regulator disposed upstream of the mixer and configured to control a flow of fluid from the hot fluid conduit to the mixer;

a second pressure compensating flow regulator disposed downstream of the mixer and the first pressure compensating flow regulator and configured to control a flow of fluid through the outlet; and a flow control valve disposed within the housing downstream of the mixer and upstream of the temperature actuated flow reducing device to control flow of fluid from the mixer towards the outlet.

2. The faucet of claim 1 wherein the first pressure compensating flow regulator is disposed in the hot fluid conduit.

3. The faucet of claim 1 wherein the first pressure compensating flow regulator is disposed within the housing.

4. The faucet of claim 1 wherein the temperature actuated flow reducing device is spaced from the mixer within the housing.

5. The faucet of claim 1, further comprising a third pressure compensating flow regulator disposed upstream of the mixer and configured to control a flow of fluid from the cold fluid conduit to the mixer.

6. The faucet of claim 1, further comprising a mounting stud depending from the housing.

7. The faucet of claim 1, wherein the first pressure compensating flow regulator is configured to adjust the flow of fluid from the hot fluid conduit to the mixer when a pressure at the cold inlet is less than a pressure at the hot inlet.

8. The faucet of claim 1 wherein the temperature actuated flow reducing device includes a wax motor.

9. The faucet of claim 1, wherein the second pressure compensating flow regulator is disposed downstream of the temperature actuated flow reducing device.

10. The faucet of claim 1, wherein the second pressure compensating flow regulator is disposed downstream of the flow control valve.

11. The faucet of claim 1, wherein the temperature actuated flow reducing device is configured to limit flow of the mixture of the first and second fluids to a rate of less than 0.2 gpm, if the temperature of the mixture of the first and second fluids exceeds a threshold temperature.

12. The faucet of claim 1, wherein the temperature actuated flow reducing device is configured to prevent flow of the mixture of the first and second fluids to the outlet, if the temperature of the mixture of the first and second fluids exceeds a threshold temperature.

13. The faucet of claim 1, wherein the first fluid is a hot fluid and the second fluid is a cold fluid, wherein the flow control valve is configured to control flow of the mixture of the hot and cold fluids from the mixer to the temperature actuated flow reducing device.

14. The faucet of claim 1, wherein the mixer is configured to receive the first and second fluids from the hot and cold inlets to produce the mixture of the first and second fluids for flow to the flow control valve, and wherein the flow control valve is configured to receive the mixture of the first and second fluids from the mixer and is openable to allow flow of the mixture of the first and second fluids through the flow control valve to the temperature actuated flow reducing device, and wherein the temperature actuated flow reducing device is configured to receive the mixture of the first and second fluids from the flow control valve and to limit or prevent flow of the mixture of the first and second fluids through the temperature actuated flow reducing device if the temperature of the mixture of the first and second fluids exceeds a threshold temperature.

15. The faucet of claim 1, wherein if a hot inlet pressure from the hot fluid conduit increases above an cold inlet pressure of the cold fluid conduit or the cold inlet pressure of the cold fluid conduit decreases below the hot inlet pressure of the hot fluid conduit, then the first pressure compensating flow regulator maintains or reduces a flow rate of fluid from the hot fluid conduit to thereby limit the temperature of fluid within the faucet and limit instances in which the temperature actuated flow reducing device limits or prevents fluid flow.

16. The faucet of claim 15, wherein if the hot inlet pressure from the hot fluid conduit decreases below the cold inlet pressure of the cold fluid conduit or the cold inlet pressure of the cold fluid conduit increases above the hot inlet pressure of the hot fluid conduit, then a third pressure compensating flow regulator increases a flow rate of fluid from the cold fluid conduit to maintain or reduce the temperature of the fluid within the faucet.

17. The faucet of claim 1, wherein the flow control valve is carried in the housing and has an open position to allow fluid flow from the mixer towards the outlet, and a closed position to block fluid flow.

18. The faucet of claim 17, further comprising a solenoid to move the valve between the open and closed positions.

19. The faucet of claim 1, wherein the housing includes:
a first member defining the hot and cold inlets and configured to house the mixer; and,
a second member defining the outlet and configured to house the temperature actuated flow reducing device.

20. The faucet of claim 19 wherein the second member is further configured to house the second pressure compensating flow regulator.

21. The faucet of claim 19 wherein the second pressure compensating flow regulator is disposed outside of the housing.

22. The faucet of claim 1, further comprising:
a sensor configured to detect an object outside of and proximate to the housing; and,
the flow control valve controlling the flow of fluid from the mixer towards the outlet responsive to an output signal of the sensor.

23. The faucet of claim 22, further comprising a solenoid disposed within the housing and configured to move the flow control valve between an open position and a closed position responsive to the output signal of the sensor.

24. The faucet of claim 23, further comprising a power source disposed within the housing.

25. A faucet, comprising:
a housing defining hot and cold inlets and an outlet;
a hot fluid conduit in fluid communication with the hot inlet;
a cold fluid conduit in fluid communication with the cold inlet;
a mixer disposed within the housing and configured to receive a first fluid from the hot fluid conduit and a second fluid from the cold fluid conduit and to output a mixture of the first and second fluids, the mixer including a mixing valve and an actuator configured to move the mixing valve to any of a plurality of positions, each position establishing a different ratio of an amount of the first fluid relative to an amount of the second fluid output by the mixer and wherein the plurality of positions includes a maximum position establishing a first maximum amount of fluid from the hot fluid conduit and a comfort position establishing a second maximum amount of fluid from the hot fluid conduit, the second maximum amount less than the first maximum amount;

a temperature actuated flow reducing device disposed within the housing downstream of the mixer and configured to restrict a flow of the mixture from the mixer to the outlet when a temperature of the fluid exceeds a predetermined temperature;

a first pressure compensating flow regulator disposed upstream of the mixer and configured to control a flow of fluid from the hot fluid conduit to the mixer;

a second pressure compensating flow regulator disposed downstream of the mixer and configured to control a flow of fluid through the outlet;

a sensor disposed within the housing and configured to detect an object outside of the housing;

a flow control valve disposed within the housing downstream of the mixer and upstream of the temperature actuated flow reducing device to control flow of fluid from the mixer towards the outlet;

a solenoid disposed within the housing and configured to move the flow control valve between an open position and a closed position responsive to the output signal of the sensor; and a controller to cause the solenoid to actuate the flow control valve, wherein the faucet is configured such that hot and cold fluids enter the hot and cold inlets from the hot and cold fluid conduits, the first pressure compensating flow regulator adjusts flow of the hot fluid responsive to changes in fluid pressure, the mixer receives the fluids and controls amounts of mixed fluid directed towards the outlet, the mixed fluid is held in place proximate an outlet of the mixer until the sensor detects an object proximate the faucet and, in response to a signal from the sensor, the controller causes the solenoid to open the flow control valve and permit the mixed fluid to flow from the mixer to the temperature actuated flow reducing device and towards the outlet, and wherein if the temperature of the mixed fluid exceeds a predetermined threshold, then the temperature actuated flow reducing device restricts the flow of the mixed fluid.

26. The faucet of claim 25 wherein the temperature actuated flow reducing device is spaced from the mixer within the housing.

27. The faucet of claim 25, wherein the first pressure compensating flow regulator is configured to adjust the flow of fluid from the hot fluid conduit to the mixer when a pressure at the cold inlet is less than a pressure at the hot inlet.

* * * * *